(12) United States Patent
Takeuchi et al.

(10) Patent No.: US 11,881,561 B2
(45) Date of Patent: Jan. 23, 2024

(54) ALL-SOLID-STATE SECONDARY BATTERY

(71) Applicant: TDK CORPORATION, Tokyo (JP)

(72) Inventors: Keiko Takeuchi, Tokyo (JP); Tetsuya Ueno, Tokyo (JP); Gakuho Isomichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 503 days.

(21) Appl. No.: 16/977,040

(22) PCT Filed: Mar. 22, 2019

(86) PCT No.: PCT/JP2019/012239
§ 371 (c)(1),
(2) Date: Aug. 31, 2020

(87) PCT Pub. No.: WO2019/188840
PCT Pub. Date: Oct. 3, 2019

(65) Prior Publication Data
US 2021/0043978 A1 Feb. 11, 2021

(30) Foreign Application Priority Data
Mar. 29, 2018 (JP) .................................. 2018-063522

(51) Int. Cl.
*H01M 10/0585* (2010.01)
*H01M 4/36* (2006.01)
(Continued)

(52) U.S. Cl.
CPC ....... *H01M 10/0585* (2013.01); *H01M 4/366* (2013.01); *H01M 4/5825* (2013.01);
(Continued)

(58) Field of Classification Search
CPC ............. H01M 10/0585; H01M 4/366; H01M 4/5825; H01M 10/0525; H01M 10/0562;
(Continued)

(56) References Cited

U.S. PATENT DOCUMENTS

2010/0216032 A1* 8/2010 Baba ................. H01M 10/0562
29/623.3
2011/0177397 A1 7/2011 Ogasa

FOREIGN PATENT DOCUMENTS

JP    2011-150817 A      8/2011
JP    2014229579 A  * 12/2014
JP    2015-049981 A      3/2015

OTHER PUBLICATIONS

Machine Translation of JP2014229579 (Year: 2014).*
(Continued)

*Primary Examiner* — Brian R Ohara
(74) *Attorney, Agent, or Firm* — Oliff PLC

(57) ABSTRACT

An all-solid-state secondary battery includes: a positive electrode active material layer; a negative electrode active material layer; and a solid electrolyte layer located between the positive electrode active material layer and the negative electrode active material layer, wherein at least one of the positive electrode active material layer and the negative electrode active material layer contains lithium vanadium phosphate, the solid electrolyte layer contains lithium zirconium phosphate, and between the positive electrode active material layer or the negative electrode active material layer containing lithium vanadium phosphate and the solid electrolyte layer, a first intermediate layer, which contains lithium vanadium phosphate containing zirconium and is located on the side of the positive electrode active material layer or the negative electrode active material layer, and a second intermediate layer, which contains lithium zirconium phosphate containing vanadium and is located on the side of the solid electrolyte layer, are provided.

14 Claims, 4 Drawing Sheets

(51) Int. Cl.
  *H01M 4/58* (2010.01)
  *H01M 10/0525* (2010.01)
  *H01M 10/0562* (2010.01)

(52) U.S. Cl.
  CPC ... *H01M 10/0525* (2013.01); *H01M 10/0562* (2013.01); *H01M 2300/0068* (2013.01)

(58) Field of Classification Search
  CPC . H01M 2300/0068; H01M 2300/0071; H01M 2300/0094; H01M 10/052; Y02E 60/10; Y02P 70/50
  See application file for complete search history.

(56) References Cited

OTHER PUBLICATIONS

Jun. 25, 2019 International Search Report issued in International Patent Application No. PCT/JP2019/012239.
Oct. 4, 2022 English Translation of the Office Action issued in Japanese Patent Application No. 2020-509990.
Translation of Feb. 22, 2023 Office Action issued in Chinese Application 201980012797.8.

* cited by examiner

ALL-SOLID-STATE SECONDARY BATTERY

TECHNICAL FIELD

The present invention relates to an all-solid-state secondary battery.

Priority is claimed on Japanese Patent Application No. 2018-063522, filed Mar. 29, 2018, the content of which is incorporated herein by reference.

BACKGROUND ART

Lithium ion secondary batteries are widely used as power supplies for portable small devices, for example, mobile phones, laptops, and PDAs. Lithium ion secondary batteries used for portable small devices are required to be smaller, thinner and more reliable.

Regarding lithium ion secondary batteries, those using an organic electrolytic solution and those using a solid electrolyte as an electrolyte are known. Compared to the lithium ion secondary battery using the organic electrolytic solution, the lithium ion secondary battery using the solid electrolyte as the electrolyte (all-solid-state secondary battery) has a higher degree of freedom in design of the shape of the battery, and a small-sized and thin battery can be easily obtained. In addition, there is an advantage of high reliability without leaking of an electrolytic solution.

In the all-solid-state secondary battery, an oxide-based solid electrolyte that is stable in air can be used. When an oxide-based solid electrolyte is used, members that form layers of the all-solid-state secondary battery can be formed into sheets, and laminated, and then fired at the same time. Therefore, industrial mass production of all-solid-state secondary batteries is possible. However, since different materials are fired at the same time, it is difficult to bond each of a positive electrode layer and a negative electrode layer, and a solid electrolyte layer which form an all-solid-state secondary battery. In addition, there is a problem in that, if the positive electrode layer and the negative electrode layer expand and contract when the all-solid-state secondary battery is charged and discharged, peeling off occurs at the interface between each of the positive electrode layer and the negative electrode layer, and the solid electrolyte, and cycle characteristics deteriorate.

Patent Literature 1 describes that mechanical bonding is strengthened by inserting an appropriate firing additive at the interface between the positive electrode layer and the solid electrolyte layer and at the interface between the negative electrode layer and the solid electrolyte layer, and the layers are bonded firmly and are resistant to mechanical stress.

CITATION LIST

Patent Literature

[Patent Literature 1] Japanese Unexamined Patent Application, First Publication No. 2011-150817

SUMMARY OF INVENTION

Technical Problem

However, as described in Patent Literature 1, it is not possible to realize a sufficient bonding state only by strengthening bonding of the layers according to design of a sintering additive. This is because the sintering additive may be destroyed due to repeated charging and discharging, and peeling off may occur between each of the positive electrode layer and the negative electrode layer, and the solid electrolyte layer. Therefore, in the all-solid-state secondary battery, further improvement in cycle characteristics is required.

The present invention has been made in order to address the above problems and an object of the present invention is to provide an all-solid-state secondary battery in which adhesion at the interface between a solid electrolyte layer and a negative electrode layer or a positive electrode layer is improved and cycle characteristics are excellent.

Solution to Problem

In order to address the above problem, the present invention provides the following solutions.

(1) An all-solid-state secondary battery according to a first aspect includes: a positive electrode active material layer; a negative electrode active material layer; and a solid electrolyte layer located between the positive electrode active material layer and the negative electrode active material layer, wherein at least one of the positive electrode active material layer and the negative electrode active material layer contains lithium vanadium phosphate, the solid electrolyte layer contains lithium zirconium phosphate, and between the positive electrode active material layer containing lithium vanadium phosphate or the negative electrode active material layer containing lithium vanadium phosphate and the solid electrolyte layer, a first intermediate layer, which contains lithium vanadium phosphate containing zirconium and is located on a side of the positive electrode active material layer or the negative electrode active material layer, and a second intermediate layer, which contains lithium zirconium phosphate containing vanadium and is located on a side of the solid electrolyte layer, are provided.

(2) In the all-solid-state secondary battery according to the above aspect, the first intermediate layer and the second intermediate layer may have a zirconium concentration gradient and a vanadium concentration gradient.

(3) In the all-solid-state secondary battery according to the above aspect, the first intermediate layer may satisfy zirconium content/(zirconium content+vanadium content) >0.1, and the thickness of the first intermediate layer may be 0.1 μm or more.

(4) In the all-solid-state secondary battery according to the above aspect, the second intermediate layer may satisfy zirconium content/(zirconium content+vanadium content) <0.9, and the thickness of the second intermediate layer may be 0.1 μm or more.

(5) In the all-solid-state secondary battery according to the above aspect, the solid electrolyte layer may satisfy zirconium content/(zirconium content+vanadium content) ≥0.9, and the thickness of the solid electrolyte layer may be 0.1 μm or more.

(6) In the all-solid-state secondary battery according to the above aspect, in the first intermediate layer, an average grain size D1 may be 0.03 to 2 μm.

(7) In the all-solid-state secondary battery according to the above aspect, in the second intermediate layer, an average grain size D2 may be 0.03 to 2 μm.

Advantageous Effects of Invention

The all-solid-state secondary battery according to the above aspect has excellent cycle characteristics during charging and discharging.

BEST MODE FOR CARRYING OUT THE INVENTION

Figure 1:
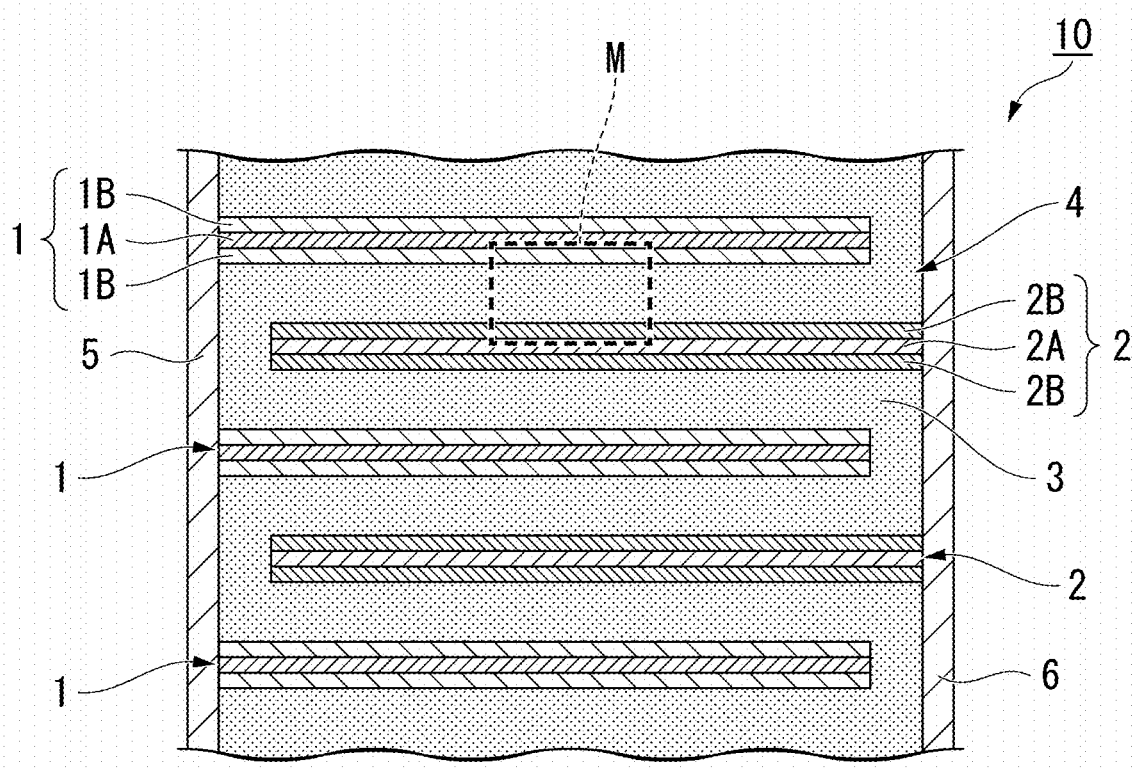
FIG. 1 is a cross-sectional schematic view of an all-solid-state secondary battery according to the present embodiment.

Embodiments of the present invention will be appropriately described below in detail with reference to the drawings. In the drawing used in the following description, in order to facilitate understanding of features of the present invention, feature parts are enlarged for convenience of illustration in some cases. Therefore, ratios between sizes and the like of components shown in the drawings may be different from those of actual components. Materials, sizes, and the like exemplified in the following description are examples, and the present invention is not limited thereto, and can be realized by appropriate modifications thereof without departing from the spirit and scope of the invention.

[All-Solid-State Secondary Battery]

FIG. 1 is a cross-sectional schematic view of an all-solid-state secondary battery 10 according to the present embodiment. The all-solid-state secondary battery 10 includes at least one first electrode layer 1, at least one second electrode layer 2, and a solid electrolyte layer 3 interposed between the first electrode layer 1 and the second electrode layer 2. The first electrode layer 1, the solid electrolyte layer 3, and the second electrode layer 2 are sequentially laminated to form a laminated body 4. The first electrode layer 1 is connected to a terminal electrode 5 arranged on one end side, and the second electrode layer 2 is connected to a terminal electrode 6 arranged on the other end side.

One of the first electrode layer 1 and the second electrode layer 2 functions as a positive electrode layer and the other thereof functions as a negative electrode layer. Hereinafter, in order to facilitate understanding, the first electrode layer 1 will be referred to as a positive electrode layer 1 and the second electrode layer 2 will be referred to as a negative electrode layer 2.

As shown in FIG. 1, the positive electrode layer 1 and the negative electrode layer 2 are alternately laminated with the solid electrolyte layer 3 therebetween. The all-solid-state secondary battery 10 is charged and discharged when ions are transferred between the positive electrode layer 1 and the negative electrode layer 2 with the solid electrolyte layer 3 therebetween.

As shown in FIG. 1, the positive electrode layer 1 includes a positive electrode current collector layer 1A containing a positive electrode current collector and a positive electrode active material layer 1B containing a positive electrode active material. The negative electrode layer 2 includes a negative electrode current collector layer 2A containing a negative electrode current collector and a negative electrode active material layer 2B containing a negative electrode active material.

A material having high conductivity can be used in the positive electrode current collector layer 1A and the negative electrode current collector layer 2A. For example, it is preferable to use silver, palladium, gold, platinum, aluminum, copper, nickel, or the like for the positive electrode current collector layer 1A and the negative electrode current collector layer 2A. Among these materials, copper is unlikely to react with a positive electrode active material, a negative electrode active material or a solid electrolyte. When copper is used in the positive electrode current collector layer 1A and the negative electrode current collector layer 2A, the internal resistance of the all-solid-state secondary battery 10 can be reduced. Here, materials constituting the positive electrode current collector layer 1A and the negative electrode current collector layer 2A may be the same as or different from each other.

The positive electrode current collector layer 1A and the negative electrode current collector layer 2A may contain a positive electrode active material and a negative electrode active material, respectively. Contents of the active materials in the respective current collector layers are not particularly limited as long as there is a function of a current collector. For example, the volume ratio of the positive electrode current collector/positive electrode active material or the negative electrode current collector/negative electrode active material is preferably in a range of 90/10 to 70/30.

Since the positive electrode current collector layer 1A and the negative electrode current collector layer 2A contain a positive electrode active material and a negative electrode active material, respectively, the adhesion between the positive electrode current collector layer 1A and the positive electrode active material layer 1B and between the negative electrode current collector layer 2A and the negative electrode active material layer 2B is improved.

The positive electrode active material layer 1B is formed on one surface or both surfaces of the positive electrode current collector layer 1A. For example, among the positive electrode layer 1 and the negative electrode layer 2, when the positive electrode layer 1 is formed as the uppermost layer of the laminated body 4 in a lamination direction, there is no opposing negative electrode layer 2 above the positive electrode layer 1 that is located on the uppermost layer. Therefore, the positive electrode active material layer 1B in the positive electrode layer 1 located on the uppermost layer may be provided only on one surface which is located on the lower side in the lamination direction. On the other hand, in order to reduce stress applied to the positive electrode current collector layer 1A, it is preferable that the positive electrode active material layer 1B be provided on both surfaces of the positive electrode current collector layer 1A.

As in the positive electrode active material layer 1B, the negative electrode active material layer 2B is also formed on one surface or both surfaces of the negative electrode current collector layer 2A. In addition, among the positive electrode layer 1 and the negative electrode layer 2, when the negative electrode layer 2 is formed as the lowermost layer of the laminated body 4 in the lamination direction, the negative electrode active material layer 2B in the negative electrode layer 2 located on the lowermost layer may be provided only on one surface which is located on the upper side in the lamination direction. On the other hand, in order to reduce stress applied to the negative electrode current collector layer 2A, it is preferable that the negative electrode active material layer 2B be provided on both surfaces of the negative electrode current collector layer 2A.

Figure 2:
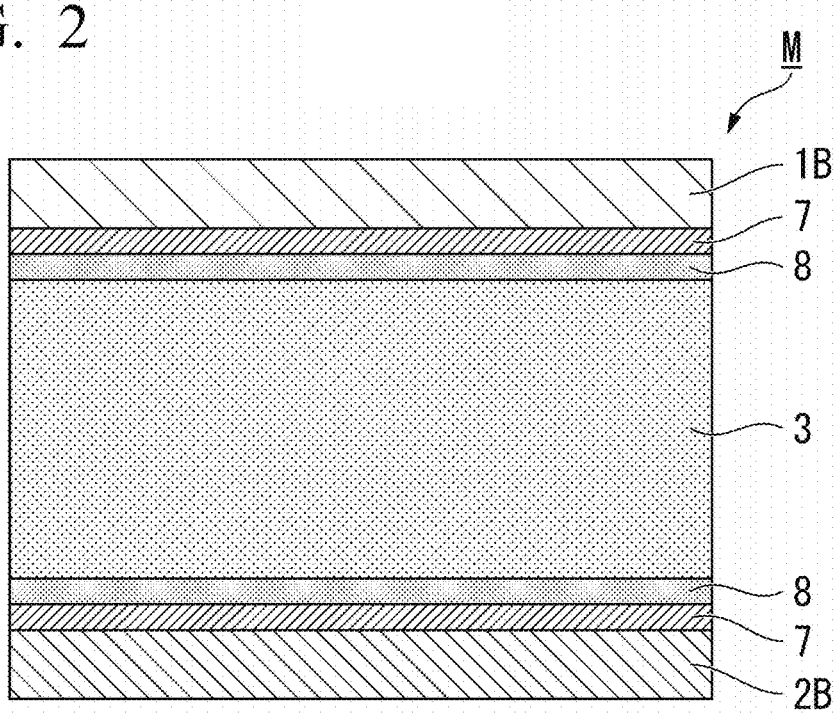
FIG. 2 is a cross-sectional schematic view of an enlarged main part of the all-solid-state secondary battery according to the present embodiment.

FIG. 2 is a cross-sectional schematic view of an enlarged main part M of the all-solid-state secondary battery 10 according to the present embodiment. FIG. 2 corresponds to the main part M surrounded by a dotted line in FIG. 1.

As shown in FIG. 2, the solid electrolyte layer 3 is located between the positive electrode active material layer 1B and the negative electrode active material layer 2B. A first intermediate layer 7 and a second intermediate layer 8 are provided between the solid electrolyte layer 3 and each of the positive electrode active material layer 1B and the negative electrode active material layer 2B.

At least one of the positive electrode active material layer 1B and the negative electrode active material layer 2B contains lithium vanadium phosphate. At least one of the positive electrode active material layer 1B and the negative electrode active material layer 2B preferably contains lithium vanadium phosphate as a main component. Regarding the lithium vanadium phosphate, $Li_3V_2(PO_4)_3$, $LiVOPO_4$, or the like can be used. In the positive electrode active material layer 1B and the negative electrode active material layer 2B, lithium ions are intercalated or deintercalated during charging and discharging.

The solid electrolyte layer 3 contains lithium zirconium phosphate. The solid electrolyte layer 3 preferably contains lithium zirconium phosphate as a main component. Regarding the lithium zirconium phosphate, $LiZr_2(PO_4)_3$ or the like can be used. The solid electrolyte layer 3 is responsible for transferring lithium ions between the positive electrode layer 1 and the negative electrode layer 2.

In FIG. 2, both the positive electrode active material layer 1B and the negative electrode active material layer 2B contain lithium vanadium phosphate, and the first intermediate layer 7 and the second intermediate layer 8 are provided in both spaces between the positive electrode active material layer 1B and the solid electrolyte layer 3, and between the negative electrode active material layer 2B and the solid electrolyte layer 3. However, the first intermediate layer 7 and the second intermediate layer 8 may be provided in only one of spaces between the positive electrode active material layer 1B and the solid electrolyte layer 3, and between the negative electrode active material layer 2B and the solid electrolyte layer 3. In addition, the first intermediate layer 7 and the second intermediate layer 8 located between the positive electrode active material layer 1B and the solid electrolyte layer 3, and the first intermediate layer 7 and the second intermediate layer 8 located between the negative electrode active material layer 2B and the solid electrolyte layer 3 need not be the same, and may have different thicknesses, constituent element ratios, and the like.

The first intermediate layer 7 is located closer to the positive electrode active material layer 1B or the negative electrode active material layer 2B than the second intermediate layer 8 is, and the second intermediate layer 8 is located closer to the solid electrolyte layer 3 than the first intermediate layer 7 is. The first intermediate layer 7 and the second intermediate layer 8 strengthen bonding at the interface between the first intermediate layer 7 and the second intermediate layer 8, and reduce a difference in expansion and contraction between the positive electrode active material layer 1B or the negative electrode active material layer 2B and the solid electrolyte layer 3 during charging and discharging. That is, the first intermediate layer 7 and the second intermediate layer 8 suppress interfacial peeling off due to expansion and contraction during charging and discharging and improve cycle characteristics of the all-solid-state secondary battery 10.

The first intermediate layer 7 contains lithium vanadium phosphate containing zirconium in which some of vanadium in the lithium vanadium phosphate is replaced with zirconium. The first intermediate layer 7 preferably contains lithium vanadium phosphate containing zirconium as a main component. Lithium vanadium phosphate containing zirconium has a crystal structure similar to that of the lithium vanadium phosphate contained in the adjacent positive electrode active material layer 1B or negative electrode active material layer 2B, therefore the first intermediate layer 7 and the adjacent positive electrode active material layer 1B or negative electrode active material layer 2B are strongly bonded.

The second intermediate layer 8 contains lithium zirconium phosphate containing vanadium in which some of zirconium in the lithium zirconium phosphate is replaced with vanadium. The second intermediate layer 8 preferably contains lithium zirconium phosphate containing vanadium as a main component. Lithium zirconium phosphate containing vanadium has a crystal structure similar to that of the lithium zirconium phosphate contained in the adjacent solid electrolyte layer 3, therefore the second intermediate layer 8 and the adjacent solid electrolyte layer 3 are strongly bonded.

Figure 3:
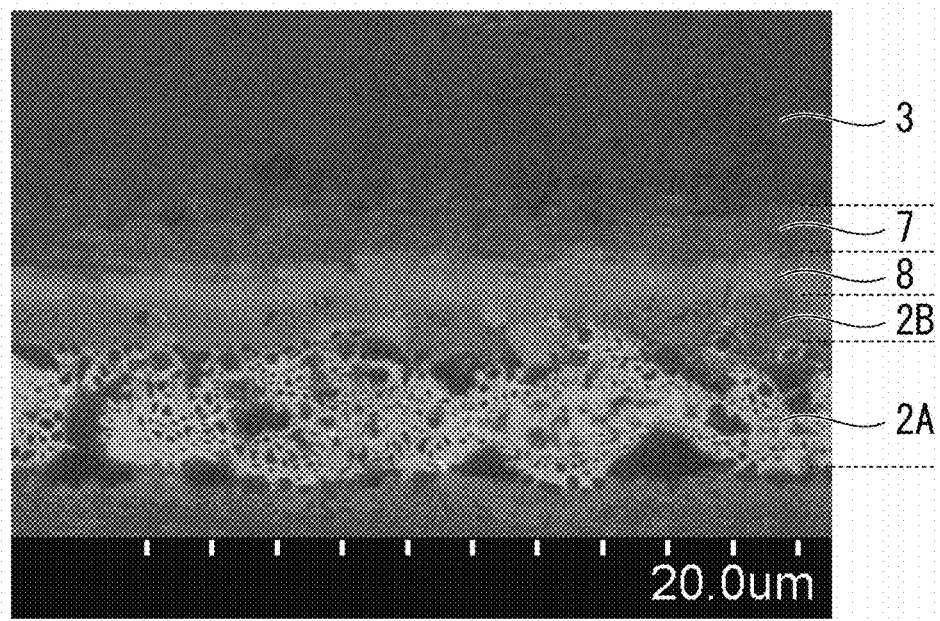
FIG. 3 shows an enlarged scanning electron microscope (SEM) image of the vicinity of a negative electrode of the all-solid-state secondary battery according to the present embodiment.

FIG. 3 shows an enlarged scanning electron microscope (SEM) image of the vicinity of a negative electrode of the all-solid-state secondary battery 10 according to the present embodiment. As shown in FIG. 3, a difference between the first intermediate layer 7 and the second intermediate layer 8 can be confirmed from the SEM image. In addition, when the main component of the first intermediate layer 7 is lithium vanadium phosphate containing zirconium, and the main component of the second intermediate layer 8 is lithium zirconium phosphate containing vanadium, a difference in the crystal structure between the first intermediate layer 7 and the second intermediate layer 8 can be clearly identified through X-ray analysis, electron beam analysis, or the like. That is, the interface between the first intermediate layer 7 and the second intermediate layer 8 can be clearly identified through X-ray analysis, electron beam analysis, or the like. In addition, the interface between the first intermediate layer 7 and the second intermediate layer 8 can be identified from a difference in the crystal structure using a transmission electron microscope (TEM).

Figure 4:
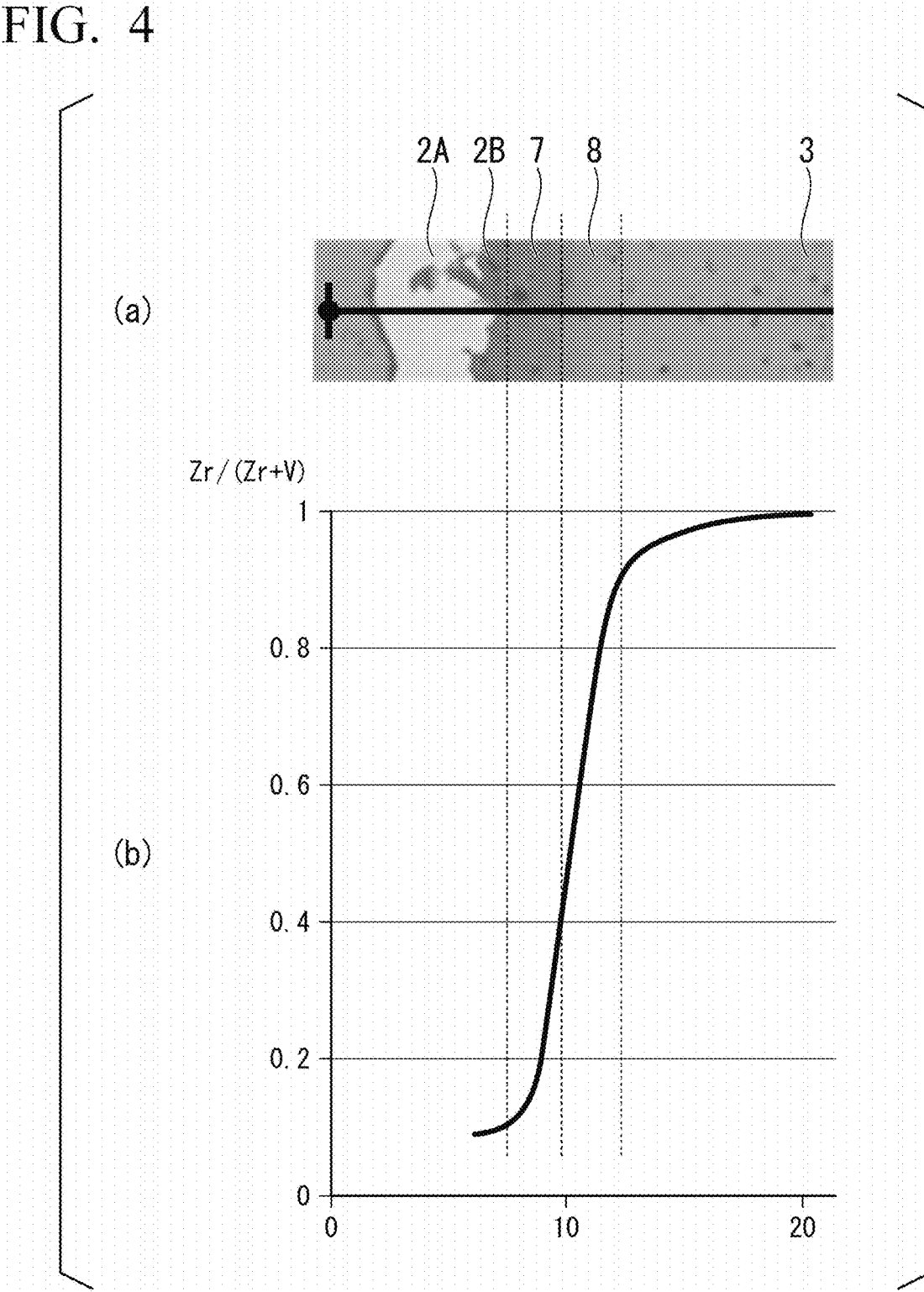
FIG. 4 shows results of an acquired line profile of contained elements using an energy-dispersive X-ray spectrometer (EDS) from the field of view of the SEM image measured in FIG. 3.

FIG. 4 shows results of an acquired line profile of contained elements using an energy-dispersive X-ray spectrometer (EDS) from the field of view of the SEM image measured in FIG. 3. FIG. 4(a) is a diagram showing measurement points, and the line profile is measured in the order of the negative electrode active material layer 2B, the first intermediate layer 7, the second intermediate layer 8, and the solid electrolyte layer 3 from the negative electrode current collector layer 2A. FIG. 4(b) shows the detected zirconium content/(zirconium content+vanadium content).

In the line profile shown in FIG. 4, the first intermediate layer 7 corresponds to a part having a crystal structure of lithium vanadium phosphate among parts in which zirconium content/(zirconium content+vanadium content)>0.1 is satisfied. The zirconium content and the vanadium content measured through EDS can be converted into a composition ratio in the parts of the first intermediate layer 7.

For example, when the composition of the first intermediate layer 7 is represented by $Li_\alpha V_\beta Zr_\gamma(PO_4)_3$, the above formula can be converted into $\gamma/(\beta+\gamma)>0.1$. In addition, for example, also if the composition of the first intermediate layer 7 is represented by $Li_\alpha V_\beta Zr_\gamma OPO_4$, similarly, it can be converted into $\gamma/(\beta+\gamma)>0.1$.

The second intermediate layer 8 corresponds to a part having a crystal structure of lithium zirconium phosphate among parts in which zirconium content/(zirconium content+vanadium content)<0.9 is satisfied. In addition, the negative electrode active material layer 2B corresponds to a part in which zirconium content/(zirconium content+vanadium content)≤0.1 is satisfied, and the solid electrolyte layer 3 corresponds to a part in which zirconium content/(zirconium content+vanadium content)≥0.9 is satisfied.

The zirconium content and the vanadium content measured through EDS can be converted into a composition ratio of all layers of the second intermediate layer 8, the negative electrode active material layer 2B and the solid electrolyte layer 3.

For example, when the composition of the second intermediate layer 8 is represented by $Li_\alpha V_\beta Zr_\gamma (PO_4)_3$, the above formula can be converted into $\gamma/(\beta+\gamma)<0.9$. In addition, the same applies to the negative electrode active material layer 2B and the solid electrolyte layer 3. The negative electrode active material layer 2B corresponds to a part of $\gamma/(\beta+\gamma) \leq 0.1$, and the solid electrolyte layer 3 corresponds to $\gamma/(\beta+\gamma) \geq 0.9$.

As shown in a region representing the first intermediate layer 7 and the second intermediate layer 8 in the line profile in FIG. 4, the first intermediate layer 7 and the second intermediate layer 8 preferably have a zirconium concentration gradient and a vanadium concentration gradient inside. When the inside has a concentration gradient, a rapid change in the zirconium concentration and the vanadium concentration is suppressed at the interface between the first intermediate layer 7 and the second intermediate layer 8, and the adhesion at the interface can be improved. In addition, preferably, the zirconium concentration and the vanadium concentration between the first intermediate layer 7 and the positive electrode active material layer 1B or the negative electrode active material layer 2B do not change rapidly but change continuously. In addition, preferably, the zirconium concentration and the vanadium concentration between the second intermediate layer 8 and the solid electrolyte layer 3 also change continuously.

Preferably, the concentration gradients of zirconium and vanadium at the interface between the positive electrode active material layer 1B or the negative electrode active material layer 2B and the first intermediate layer 7 and at the interface between the solid electrolyte layer 3 and the second intermediate layer 8 are gentle. In addition, preferably, the concentration gradients of zirconium and vanadium at the interface between the first intermediate layer 7 and the second intermediate layer 8 are steep.

The thickness of the first intermediate layer 7 is preferably 0.1 μm or more, more preferably 1.0 μm or more, and still more preferably 2.0 μm or more. In addition, the thickness of the first intermediate layer 7 is preferably 10.0 μm or less and more preferably 5.0 μm or less.

The first intermediate layer 7 is a layer which has a crystal structure similar to that of the positive electrode active material layer 1B or the negative electrode active material layer 2B, and is different from the positive electrode active material layer 1B or the negative electrode active material layer 2B in that it contains zirconium. Therefore, in the first intermediate layer 7, the amount of inflowing and outflowing lithium ions is smaller than that in the positive electrode active material layer 1B or the negative electrode active material layer 2B. In addition, expansion and contraction of the first intermediate layer 7 during charging and discharging are smaller than those of the positive electrode active material layer 1B or the negative electrode active material layer 2B.

When the thickness of the first intermediate layer 7 is too thin, the concentration gradient of zirconium and vanadium in the first intermediate layer 7 becomes steep. As a result, when the all-solid-state secondary battery 10 is charged and discharged, an effect of relaxing a difference in the expansion and contraction between the first intermediate layer 7 and the second intermediate layer 8, and between the first intermediate layer 7 and the positive electrode active material layer 1B or the negative electrode active material layer 2B is reduced. When the thickness of the first intermediate layer 7 is too thick, the size of the all-solid-state secondary battery 10 becomes excessively large.

The thickness of the second intermediate layer 8 is preferably 0.1 μm or more, more preferably 1.0 μm or more, and still more preferably 2.0 μm or more. In addition, the thickness of the second intermediate layer 8 is preferably 10.0 μm or less and more preferably 5.0 μm or less.

The second intermediate layer 8 is a layer which has a crystal structure similar to that of the solid electrolyte layer 3 and is different from the solid electrolyte layer 3 in that it contains vanadium. Therefore, in the second intermediate layer 8, inflow and outflow of lithium ions occur, and expansion and contraction occur when the all-solid-state secondary battery 10 is charged and discharged.

When the thickness of the second intermediate layer 8 is too thin, the concentration gradient of zirconium and vanadium in the second intermediate layer 8 becomes steep. As a result, when the all-solid-state secondary battery 10 is charged and discharged, an effect of relaxing a difference in the expansion and contraction between the first intermediate layer 7 and the second intermediate layer 8 and between the second intermediate layer 8 and the solid electrolyte layer 3 is reduced. When the thickness of the second intermediate layer 8 is too thick, the size of the all-solid-state secondary battery 10 becomes excessively large.

The thickness of the solid electrolyte layer 3 is preferably 0.1 μm or more, more preferably 1.0 μm or more, and still more preferably 3 μm or more. When the thickness of the solid electrolyte layer 3 is thin, the solid electrolyte layer 3 cannot secure sufficient insulation, and short circuiting easily occurs between the positive electrode layer 1 and the negative electrode layer 2.

The thickness of the first intermediate layer 7, the thickness of the second intermediate layer 8, and the thickness of the solid electrolyte layer 3 are determined from the SEM image and the line profile through SEM-EDS. The boundary between the first intermediate layer 7 and the second intermediate layer 8 is determined from SEM images. Then, when the thickness in a range in which the composition ratio (zirconium content/(zirconium content+vanadium content)) measured through the line profile is within a predetermined range is measured, the thicknesses of the first intermediate layer 7, the second intermediate layer 8 and the solid electrolyte layer 3 are measured.

Figure 5:
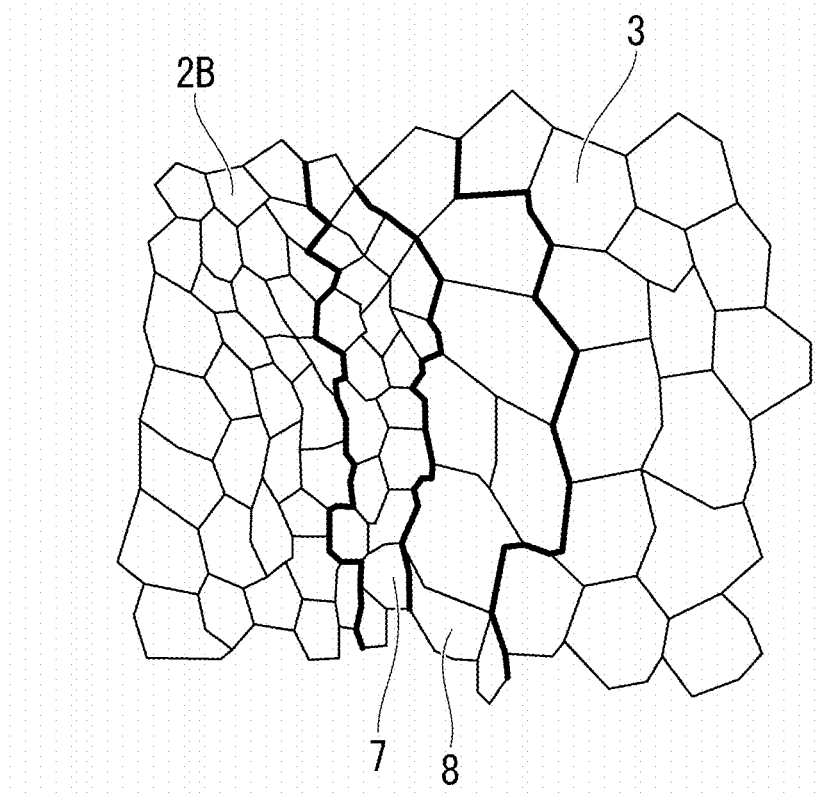
FIG. 5 shows a schematic view of an enlarged transmission electron microscope (TEM) image of the vicinity of the negative electrode of the all-solid-state secondary battery according to the present embodiment.

FIG. 5 shows a schematic view of an enlarged transmission electron microscope (TEM) image of the vicinity of the negative electrode of the all-solid-state secondary battery 10 according to the present embodiment. In the all-solid-state secondary battery 10 according to the present embodiment, since the amount of electrons transmitted differs for each crystal orientation, the crystal grain boundary of all layers including the first intermediate layer 7, the second intermediate layer 8, the negative electrode active material layer 2B and the solid electrolyte layer 3 can be identified from the TEM image.

The crystal grain area obtained by performing direct measurement on the TEM image is divided by an observation magnification of the TEM image to obtain a crystal grain cross-sectional area C. Then, assuming that the outline of the crystal grain is a circle, the diameter D of the crystal grain can be obtained using the cross-sectional area C of the crystal grain from the formula for obtaining the area of a circle. Specifically, the diameter D of the crystal grain can be obtained by calculating $\sqrt{(4C/\pi)}=D$.

Average values of 30 or more diameters D of the crystal grains of the first intermediate layer 7 and the second intermediate layer 8 measured using the above method are set as an average grain size D1 of the first intermediate layer 7 and an average grain size D2 of the second intermediate layer 8.

The average grain size D1 of the first intermediate layer 7 is preferably 0.03 to 2 μm. When the average grain size D1 of the first intermediate layer 7 exceeds 2 μm, this is not preferable because the strength of the first intermediate layer 7 decreases and cycle characteristics deteriorate. In addition, similarly, when the average grain size of the first intermediate layer 7 is less than 0.03 μm, this is not preferable because the strength decreases and cycle characteristics deteriorate.

The average grain size D2 of the second intermediate layer 8 is preferably 0.03 to 2 μm. When the average grain size of the second intermediate layer 8 exceeds 2 μm, this is not preferable because the strength of the second intermediate layer 8 decreases and cycle characteristics deteriorate. In addition, similarly, when the average grain size of the second intermediate layer 8 is less than 0.03 μm, this is not preferable because the strength decreases and cycle characteristics deteriorate.

(Terminal Electrode)

As shown in FIG. 1, the terminal electrodes 5 and 6 are formed to be in contact with side surfaces (exposed end surfaces of the positive electrode layer 1 and the negative electrode layer 2) of the laminated body 4. The terminal electrodes 5 and 6 are connected to external terminals and transfer electrons to the laminated body 4.

For the terminal electrodes 5 and 6, a material having high conductivity is preferably used. The material of the terminal electrodes 5 and 6 is not particularly limited, but for example, silver, gold, platinum, aluminum, copper, tin, nickel, gallium, indium, and alloys thereof can be used.

"Method of Producing All-Solid-State Secondary Battery"

(Formation of Laminated Body)

A paste for constituting each layer is prepared, the paste is then applied and dried to prepare a green sheet, thermo-compression bonding is performed by applying pressure and heating, and thereby the laminated body 4 can be prepared. That is, a method of producing the laminated body 4 includes a process in which a paste of each material constituting the laminated body 4 is prepared (paste preparation process), a process in which the paste is applied and dried to prepare a green sheet (green sheet preparation process), a process in which the green sheets are laminated to form a laminated body (lamination process), and a process in which the laminated body is subjected to thermo-compression bonding (thermo-compression bonding process). After the thermo-compression bonding process is completed, the laminated body is fired and cooled.

<Paste Preparation Process>

In the paste preparation process, materials of the positive electrode current collector layer 1A, the positive electrode active material layer 1B, the solid electrolyte layer 3, the negative electrode active material layer 2B, and the negative electrode current collector layer 2A which constitute the laminated body 4 are formed into a paste.

A method of forming each material into a paste is not particularly limited. For example, a method in which powders of materials are mixed in a vehicle to obtain a paste may be exemplified. The vehicle includes a solvent, a binder, and the like. Then, a paste for the positive electrode current collector layer 1A, a paste for the positive electrode active material layer 1B, a paste for the solid electrolyte layer 3, a paste for the negative electrode active material layer 2B, and a paste for the negative electrode current collector layer 2A are prepared.

<Green Sheet Preparation Process>

Then, a green sheet is prepared. The green sheet is obtained by applying the prepared paste to a substrate such as a polyethylene terephthalate (PET) film, and as necessary performing drying, and then peeling off the substrate. A method of applying the paste to the substrate is not particularly limited. For example, known methods such as screen printing, application, transferring, and a doctor blade method can be used.

<Lamination Process>

Next, the prepared green sheets are laminated in a desired order and number of laminations to obtain a laminated sheet. When the green sheets are laminated, as necessary, the green sheets are aligned and cut. For example, when a parallel type battery is prepared, preferably, alignment is performed so that the end surface of the positive electrode current collector layer does not match the end surface of the negative electrode current collector layer, and the green sheets are laminated.

A laminated sheet may be prepared using a method in which a positive electrode active material layer unit and a negative electrode active material layer unit to be described below are prepared and then they are laminated.

First, a paste for the solid electrolyte layer 3 is applied to a substrate such as a PET film by a doctor blade method and dried to form a sheet-like solid electrolyte layer 3. Next, a paste for the positive electrode active material layer 1B is printed on the solid electrolyte layer 3 by screen printing and dried to form the positive electrode active material layer 1B. Then, a paste for the positive electrode current collector layer 1A is printed on the positive electrode active material layer 1B by screen printing and dried to form the positive electrode current collector layer 1A. In addition, a paste for the positive electrode active material layer 1B is printed on the positive electrode current collector layer 1A by screen printing and dried to form the positive electrode active material layer 1B.

Then, the PET film is peeled off and thereby a positive electrode active material layer unit in which the solid electrolyte layer 3/the positive electrode active material layer 1B/the positive electrode current collector layer 1A/the positive electrode active material layer 1B are laminated in this order is obtained. In the same procedure, a negative electrode active material layer unit in which the solid electrolyte layer 3/the negative electrode active material layer 2B/the negative electrode current collector layer 2A/the negative electrode active material layer 2B are laminated in this order is obtained.

Next, the positive electrode active material layer unit and the negative electrode active material layer unit are alternately laminated one by one. In this case, the solid electrolyte layer 3 of the positive electrode active material layer unit and the negative electrode active material layer 2B of the negative electrode active material layer unit or the positive electrode active material layer 1B of the positive electrode active material layer unit and the solid electrolyte layer 3 of the negative electrode active material layer unit are laminated in contact with each other. Thereby, the positive electrode active material layer 1B/the positive electrode current collector layer 1A/the positive electrode active material layer 1B/the solid electrolyte layer 3/the negative electrode active material layer 2B/the negative electrode current collector layer 2A/the negative electrode active material layer 2B/the solid electrolyte layer 3 are laminated in this order.

When the positive electrode active material layer unit and the negative electrode active material layer unit are laminated, the units are shifted and laminated so that the positive electrode current collector layer 1A of the positive electrode active material layer unit extends only to one end surface and the negative electrode current collector layer 2A of the negative electrode active material layer unit extends only to the other surface. A sheet for the solid electrolyte layer 3 with a predetermined thickness is additionally laminated on both surfaces of the laminated units to prepare a laminated sheet.

<Thermo-Compression Bonding Process>

Next, the prepared laminated sheets are collectively subjected to therm-compression bonding. Compression is preferably performed while heating. The heating temperature during compression is not particularly limited, being, for example, 40 to 95° C.

The prepared laminated sheet can be cut into the laminated body 4 of an unfired laminated all-solid-state battery using a dicing device.

The laminated body 4 of the laminated all-solid-state battery is subjected to de-binding and firing to produce a laminated all-solid-state battery 11. The de-binding and firing can be performed by firing, for example, under a nitrogen atmosphere at a temperature of 600° C. to 900° C. The de-binding and firing maintaining time is, for example, 0.1 to 6 hours.

(Cooling of Laminated Body)

The laminated body 4 after a predetermined firing time is subjected to a two-stage cooling process stepwise. The two-stage cooling process is performed according to the following procedures. First, in a first process, the temperature is lowered from a firing temperature to a first cooling temperature. Then, in a second process, the first cooling temperature is maintained for a predetermined time. Finally, in a third process, the first cooling temperature is rapidly lowered to room temperature. Cooling process conditions are not particularly limited. As an example, a firing temperature of 900° C. may be temporarily lowered to a first cooling temperature of 800° C., and the first cooling temperature of 800° C. may be maintained for a predetermined time, and then lowered to room temperature.

After this process, zirconium thermally diffuses from the solid electrolyte layer 3 toward the positive electrode active material layer 1B or the negative electrode active material layer 2B, and vanadium thermally diffuses from the positive electrode active material layer 1B or the negative electrode active material layer 2B toward the solid electrolyte layer 3, and the first intermediate layer 7 and the second intermediate layer 8 are formed. When the first cooling temperature and a first cooling temperature maintaining time are changed, it is possible to freely adjust the zirconium or vanadium concentration gradient in the first intermediate layer 7 and the second intermediate layer 8.

Regarding the first intermediate layer 7 and the second intermediate layer 8, layers in which constituent elements are adjusted in advance may be separately prepared, and inserted between the solid electrolyte layer 3 and the positive electrode active material layer 1B or the negative electrode active material layer 2B.

The terminal electrodes 5 and 6 are formed at ends of the laminated body 4 prepared in the above procedures and thereby an all-solid-state lithium ion secondary battery can be prepared. The terminal electrodes 5 and 6 can be prepared by a method of Au sputtering or the like.

As described above, since the all-solid-state secondary battery 10 according to the present embodiment includes the first intermediate layer 7 and the second intermediate layer 8, the solid electrolyte layer 3 and the positive electrode active material layer 1B or the negative electrode active material layer 2B are strongly bonded. In addition, when the all-solid-state secondary battery 10 is charged and discharged, inflow and outflow of lithium ions gradually change in the order of the positive electrode active material layer 1B or the negative electrode active material layer 2B/the first intermediate layer 7/the second intermediate layer 8, and thus a difference in expansion and contraction at the interface between the layers during charging and discharging becomes gentle. The first intermediate layer 7 expands and contracts less than the positive electrode active material layer 1B or the negative electrode active material layer 2B, and the second intermediate layer 8 expands and contracts unlike the solid electrolyte layer 3. Therefore, in the all-solid-state secondary battery 10 according to the present embodiment, the occurrence of interfacial peeling off due to expansion and contraction during charging and discharging is suppressed, and cycle characteristics are excellent.

When the first intermediate layer 7 and the second intermediate layer 8 have a composition gradient for zirconium and vanadium, there is a difference in the expansion and contraction rate in the first intermediate layer 7 and the second intermediate layer 8. The expansion and contraction rate is high on the side closer to the positive electrode active material layer 1B or the negative electrode active material layer 2B, and the expansion and contraction rate is small on the side closer to the solid electrolyte layer 3, and peeling off is further reduced.

While the embodiments of the present invention have been described in detail above with reference to the drawings, configurations and combinations thereof in the embodiments are only examples, and additions, omissions, substitutions, and other modifications of the configurations can be made without departing from the scope of the present invention.

EXAMPLES

Examples 1 to 27 and Comparative Example 1

All-solid-state secondary batteries according to Examples 1 to 27 and Comparative Example 1 were prepared. A lead wire was attached to terminal electrodes of the respective all-solid-state secondary batteries, a charging and discharging test was performed, and the initial discharge capacity, the capacity retention rate after 10 cycles and the capacity retention rate after 30 cycles of the all-solid-state secondary batteries were measured. Regarding measurement conditions, currents during charging and discharging were both 2.0 µA, cutoff voltages during charging and during discharging were 2.6 V and 0 V, and the discharge capacity was recorded. The results are shown in Table 3.

All-solid-state lithium ion secondary batteries were prepared by laminating the solid electrolyte layer 3/the positive electrode active material layer 1B/the positive electrode current collector layer 1A/the positive electrode active material layer 1B/the solid electrolyte layer 3/the negative electrode active material layer 2B/the negative electrode current collector layer 2A/the negative electrode active material layer 2B/the solid electrolyte layer 3 in this order and performing a simultaneous firing method.

In Example 1, firing and cooling conditions were as follows. First, regarding the firing conditions, under a nitrogen atmosphere, a maximum temperature (firing temperature) during firing was 850° C., and a firing temperature maintaining time was 0.1 hours. Regarding the cooling conditions, the firing temperature was lowered to a first cooling temperature of 700° C., the temperature was maintained at the first cooling temperature of 700° C. for 0.5 hours, and rapid cooling was then performed.

The positive electrode current collector layer 1A and the negative electrode current collector layer 2A were made of Cu. Both of the positive electrode active material layer 1B and the negative electrode active material layer 2B were made of $Li_3V_2(PO_4)_3$. The solid electrolyte layer 3 was made of $LiZr_2(PO_4)_3$.

The firing conditions and cooling conditions of Examples 2 to 27 and Comparative Example 1 were different from those of Example 1. The firing conditions and the cooling conditions are summarized in Table 1. In Examples 3 to 5, Examples 7 to 10, Example 12, Example 14, Example 17 and Examples 19 to 27, a sintering additive was added to the positive electrode active material layer 1B, the negative electrode active material layer 2B and/or the solid electrolyte layer 3. In Table 1, "LVP sintering additive added" indicates that a sintering additive was added to the positive electrode active material layer 1B and the negative electrode active material layer 2B, and "LZP sintering additive added" indicates that a sintering additive was added to the solid electrolyte layer 3. $H_3BO_3$ was used as the sintering additive.

TABLE 1

| | Firing top temperature ° C. | Top temperature maintenance time Time | Annealing temperature ° C. | Annealing time Time | LVP sintering additive added Yes or no | LZP sintering additive added Yes or no |
|---|---|---|---|---|---|---|
| Comparative Example 1 | 850 | 0.1 | — | — | No | No |
| Example 1 | 850 | 0.1 | 700 | 0.5 | No | No |
| Example 2 | 850 | 0.1 | 700 | 1 | No | No |
| Example 3 | 850 | 0.1 | 700 | 1 | No | Yes |
| Example 4 | 850 | 0.1 | 700 | 1 | Yes | No |
| Example 5 | 850 | 0.1 | 700 | 1 | Yes | Yes |
| Example 6 | 890 | 0.1 | 750 | 0.5 | No | No |
| Example 7 | 890 | 0.1 | 750 | 0.5 | No | Yes |
| Example 8 | 890 | 0.1 | 750 | 0.5 | Yes | No |
| Example 9 | 890 | 0.1 | 750 | 0.5 | Yes | Yes |
| Example 10 | 890 | 0.1 | 750 | 1 | Yes | Yes |
| Example 11 | 890 | 0.1 | 800 | 1 | No | No |
| Example 12 | 890 | 0.1 | 800 | 1 | No | Yes |
| Example 13 | 890 | 0.1 | 800 | 2 | No | No |
| Example 14 | 890 | 0.1 | 800 | 2 | No | Yes |
| Example 15 | 890 | 0.1 | 800 | 3 | No | No |
| Example 16 | 890 | 0.1 | 750 | 1 | No | No |
| Example 17 | 890 | 0.1 | 750 | 1 | No | Yes |
| Example 18 | 890 | 0.1 | 790 | 1 | No | No |
| Example 19 | 890 | 0.1 | 790 | 1 | No | Yes |
| Example 20 | 890 | 0.1 | 800 | 3 | No | Yes |
| Example 21 | 890 | 0.1 | 800 | 3 | No | Yes |
| Example 22 | 890 | 0.1 | 800 | 3 | Yes | No |
| Example 23 | 890 | 0.1 | 800 | 3 | Yes | No |
| Example 24 | 890 | 0.1 | 800 | 3 | Yes | Yes |
| Example 25 | 890 | 0.1 | 800 | 3 | Yes | Yes |
| Example 26 | 850 | 0.1 | 700 | 0.5 | No | Yes |
| Example 27 | 850 | 0.1 | 700 | 0.5 | Yes | No |

The initial discharging capacities and the capacity retention rates of Examples 1 to 27 and Comparative Example 1 were determined. A capacity during the first discharging was defined as the initial discharge capacity. The capacity retention rate was obtained by dividing the discharge capacity at each time (10th cycle or 30th cycle) by the initial discharge capacity. In addition, in Examples 1 to 27 and Comparative Example 1, the thicknesses of the active material layer, the first intermediate layer 7, the second intermediate layer 8, and the solid electrolyte layer were determined from the SEM image and line profiles through SEM-EDS. The results are shown in Table 2. Here, the active material layer in the notation corresponds to the positive electrode active material layer 1B and the negative electrode active material layer 2B.

TABLE 2

| | Thickness of active material layer μm | Thickness of first intermediate layer μm | Thickness of second intermediate layer μm | Thickness of solid electrolyte layer μm | Average grain size of first intermediate layer μm | Average grain size of second intermediate layer μm |
|---|---|---|---|---|---|---|
| Comparative Example 1 | 5.00 | 0.00 | 0.00 | 20.00 | — | — |
| Example 1 | 4.95 | 0.05 | 0.05 | 19.95 | 0.02 | 0.02 |
| Example 2 | 4.91 | 0.09 | 0.09 | 19.91 | 0.03 | 0.03 |
| Example 3 | 4.91 | 0.09 | 0.10 | 19.90 | 0.03 | 0.04 |
| Example 4 | 4.90 | 0.10 | 0.09 | 19.91 | 0.04 | 0.03 |
| Example 5 | 4.90 | 0.10 | 0.10 | 19.90 | 0.04 | 0.04 |
| Example 6 | 4.00 | 1.00 | 1.00 | 19.00 | 0.30 | 0.30 |
| Example 7 | 4.00 | 1.00 | 2.00 | 18.00 | 0.30 | 0.50 |
| Example 8 | 3.00 | 2.00 | 1.00 | 19.00 | 0.50 | 0.30 |
| Example 9 | 3.00 | 2.00 | 2.00 | 18.00 | 0.50 | 0.50 |
| Example 10 | 2.00 | 3.00 | 3.00 | 17.00 | 0.60 | 0.60 |
| Example 11 | 10.00 | 5.00 | 5.00 | 15.00 | 1.00 | 1.00 |
| Example 12 | 10.00 | 5.00 | 6.00 | 14.00 | 1.00 | 1.20 |
| Example 13 | 5.00 | 10.00 | 10.00 | 10.00 | 1.50 | 1.50 |
| Example 14 | 5.00 | 10.00 | 11.00 | 9.00 | 1.50 | 1.80 |
| Example 15 | 3.00 | 12.00 | 12.00 | 8.00 | 1.80 | 1.80 |
| Example 16 | 2.00 | 3.00 | 3.00 | 2.00 | 0.50 | 0.50 |
| Example 17 | 2.00 | 3.00 | 4.00 | 1.00 | 0.50 | 0.60 |
| Example 18 | 0.10 | 4.90 | 4.90 | 0.10 | 1.50 | 1.50 |
| Example 19 | 0.10 | 4.90 | 4.91 | 0.09 | 1.50 | 1.80 |
| Example 20 | 3.00 | 12.00 | 12.50 | 7.50 | 1.80 | 2.10 |
| Example 21 | 3.00 | 12.00 | 13.00 | 7.00 | 1.80 | 2.50 |
| Example 22 | 2.50 | 12.50 | 12.00 | 8.00 | 2.10 | 1.80 |
| Example 23 | 2.00 | 13.00 | 12.00 | 8.00 | 2.50 | 1.80 |
| Example 24 | 2.50 | 12.50 | 12.50 | 7.50 | 2.10 | 2.10 |
| Example 25 | 2.00 | 13.00 | 13.00 | 7.00 | 2.50 | 2.50 |
| Example 26 | 4.95 | 0.05 | 0.08 | 19.92 | 0.02 | 0.03 |
| Example 27 | 4.92 | 0.08 | 0.05 | 19.95 | 0.03 | 0.02 |

TABLE 3

| | Initial discharge capacity μAh | Capacity retention rate 10th cycle % | Capacity retention rate 30th cycle % | Composition of boundary between first intermediate layer and second intermediate layer Zr/(Zr + V) | Average composition gradient of first intermediate layer (Zr/(Zr + V))/μm | Average composition gradient of second intermediate layer (Zr/(Zr + V))/μm |
|---|---|---|---|---|---|---|
| Comparative Example 1 | 11.10 | 44.1 | 26.1 | — | — | — |
| Example 1 | 11.30 | 68.1 | 50.4 | 0.5 | 8.00 | 8.00 |
| Example 2 | 11.50 | 75.7 | 61.7 | 0.5 | 4.44 | 4.44 |
| Example 3 | 11.60 | 78.4 | 64.7 | 0.48 | 4.22 | 4.20 |
| Example 4 | 11.90 | 79.0 | 63.9 | 0.52 | 4.20 | 4.22 |
| Example 5 | 11.70 | 82.9 | 72.6 | 0.5 | 4.00 | 4.00 |
| Example 6 | 11.60 | 86.2 | 80.2 | 0.5 | 0.40 | 0.40 |
| Example 7 | 11.50 | 87.8 | 82.6 | 0.4 | 0.30 | 0.25 |
| Example 8 | 11.30 | 90.3 | 85.8 | 0.6 | 0.25 | 0.30 |
| Example 9 | 11.20 | 93.8 | 88.4 | 0.5 | 0.20 | 0.20 |
| Example 10 | 11.00 | 96.4 | 95.5 | 0.5 | 0.13 | 0.13 |
| Example 11 | 15.40 | 93.5 | 85.7 | 0.5 | 0.08 | 0.08 |
| Example 12 | 14.20 | 85.9 | 76.8 | 0.44 | 0.07 | 0.08 |
| Example 13 | 11.30 | 83.2 | 72.6 | 0.5 | 0.04 | 0.04 |
| Example 14 | 9.30 | 79.6 | 67.7 | 0.46 | 0.04 | 0.04 |
| Example 15 | 8.20 | 76.8 | 65.9 | 0.5 | 0.03 | 0.03 |
| Example 16 | 9.80 | 90.8 | 84.7 | 0.5 | 0.13 | 0.13 |
| Example 17 | 8.30 | 90.4 | 83.1 | 0.42 | 0.11 | 0.12 |
| Example 18 | 7.20 | 84.7 | 73.6 | 0.5 | 0.08 | 0.08 |
| Example 19 | 5.90 | 76.3 | 66.1 | 0.49 | 0.08 | 0.08 |
| Example 20 | 8.00 | 70.7 | 59.3 | 0.48 | 0.03 | 0.03 |
| Example 21 | 7.90 | 70.1 | 58.4 | 0.45 | 0.03 | 0.03 |
| Example 22 | 8.10 | 72.1 | 62.3 | 0.53 | 0.03 | 0.03 |
| Example 23 | 8.00 | 71.3 | 60.4 | 0.55 | 0.03 | 0.03 |
| Example 24 | 7.80 | 67.1 | 54.9 | 0.5 | 0.03 | 0.03 |
| Example 25 | 7.60 | 66.3 | 52.3 | 0.5 | 0.03 | 0.03 |
| Example 26 | 11.40 | 70.4 | 54.5 | 0.48 | 7.60 | 5.25 |
| Example 27 | 11.40 | 69.9 | 54.1 | 0.52 | 5.25 | 7.60 |

As shown in Table 3, the capacity retention rates in the 10th cycle and the 30th cycle in Examples 1 to 27 were both higher than the capacity retention rate in the 10th cycle and the 30th cycle in comparative examples. Therefore, the all-solid-state secondary battery produced using the present invention had excellent cycle characteristics.

INDUSTRIAL APPLICABILITY

According to the present invention, it is possible to provide an all-solid-state secondary battery having high safety, which is easily reduced in size and is easily thinned. Therefore, the all-solid-state secondary battery according to the present invention can be widely applied as a power supply for a portable small device such as a mobile phone, a laptop, and a PDA.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
4 Laminated body
5, 6 Terminal electrode
7 First intermediate layer
8 Second intermediate layer
10 All-solid-state secondary battery

The invention claimed is:

1. An all-solid-state secondary battery, comprising:
a positive electrode active material layer;
a negative electrode active material layer; and
a solid electrolyte layer located between the positive electrode active material layer and the negative electrode active material layer,
wherein at least one of the positive electrode active material layer and the negative electrode active material layer contains lithium vanadium phosphate,
wherein the solid electrolyte layer contains lithium zirconium phosphate, and
wherein both of a first intermediate layer and a second intermediate layer which are in direct physical contact with each other are provided between the positive electrode active material layer containing lithium vanadium phosphate or the negative electrode active material layer containing lithium vanadium phosphate and the solid electrolyte layer,
the first intermediate layer contains lithium vanadium phosphate containing zirconium and is located on a side of the positive electrode active material layer or the negative electrode active material layer, and the second intermediate layer contains lithium zirconium phosphate containing vanadium and is located on a side of the solid electrolyte layer,
wherein the first intermediate layer and the second intermediate layer have a zirconium concentration gradient and a vanadium concentration gradient inside,
wherein a zirconium concentration and a vanadium concentration between the first intermediate layer and the positive electrode active material layer or the negative electrode active material layer change continuously, and
wherein a zirconium concentration and a vanadium concentration between the second intermediate layer and the solid electrolyte layer change continuously.

2. The all-solid-state secondary battery according to claim 1,
wherein the first intermediate layer satisfies zirconium content/(zirconium content+vanadium content)>0.1, and
wherein the thickness of the first intermediate layer is 0.1 μm or more.

3. The all-solid-state secondary battery according to claim 1,
wherein the second intermediate layer satisfies zirconium content/(zirconium content+vanadium content)<0.9, and
wherein the thickness of the second intermediate layer is 0.1 μm or more.

4. The all-solid-state secondary battery according to claim 1,
wherein the solid electrolyte layer satisfies zirconium content/(zirconium content+vanadium content)≥0.9, and
wherein the thickness of the solid electrolyte layer is 0.1 μm or more.

5. The all-solid-state secondary battery according to claim 1,
wherein, in the first intermediate layer, an average grain size D1 is 0.03 to 2 μm.

6. The all-solid-state secondary battery according to claim 1,
wherein, in the second intermediate layer, an average grain size D2 is 0.03 to 2 μm.

7. The all-solid-state secondary battery according to claim 2,
wherein the second intermediate layer satisfies zirconium content/(zirconium content+vanadium content)<0.9, and
wherein the thickness of the second intermediate layer is 0.1 μm or more.

8. The all-solid-state secondary battery according to claim 2,
wherein the solid electrolyte layer satisfies zirconium content/(zirconium content+vanadium content)≥0.9, and
wherein the thickness of the solid electrolyte layer is 0.1 μm or more.

9. The all-solid-state secondary battery according to claim 3,
wherein the solid electrolyte layer satisfies zirconium content/(zirconium content+vanadium content)≥0.9, and
wherein the thickness of the solid electrolyte layer is 0.1 μm or more.

10. The all-solid-state secondary battery according to claim 2,
wherein, in the first intermediate layer, an average grain size D1 is 0.03 to 2 μm.

11. The all-solid-state secondary battery according to claim 3,
wherein, in the first intermediate layer, an average grain size D1 is 0.03 to 2 μm.

12. The all-solid-state secondary battery according to claim 4,
wherein, in the first intermediate layer, an average grain size D1 is 0.03 to 2 μm.

13. The all-solid-state secondary battery according to claim 2,
   wherein, in the second intermediate layer, an average grain size D2 is 0.03 to 2 μm.

14. The all-solid-state secondary battery according to claim 3,
   wherein, in the second intermediate layer, an average grain size D2 is 0.03 to 2 μm.

\* \* \* \* \*